United States Patent [19]

Matsuura

[11] Patent Number: 5,606,645
[45] Date of Patent: Feb. 25, 1997

[54] SPEECH PATTERN RECOGNITION APPARATUS UTILIZING MULTIPLE INDEPENDENT SEQUENCES OF PHONETIC SEGMENTS

[75] Inventor: Hiroshi Matsuura, Kamakura, Japan

[73] Assignee: Kabushiki Kaisha Toshiba, Kawasaki, Japan

[21] Appl. No.: 193,636

[22] Filed: Feb. 8, 1994

Related U.S. Application Data

[63] Continuation of Ser. No. 843,117, Feb. 28, 1992, abandoned.

[51] Int. Cl.$^6$ .............................. G10L 5/06; G10L 9/00
[52] U.S. Cl. ................................ 395/2.65; 395/2.45
[58] Field of Search .......................... 395/2, 2.65, 2.4, 395/2.64, 2.41, 2.45

[56] References Cited

U.S. PATENT DOCUMENTS

| | | | |
|---|---|---|---|
| 4,723,290 | 2/1988 | Watanabe et al. | 395/2 |
| 4,748,670 | 5/1988 | Bahl et al. | 395/2 |
| 4,882,759 | 11/1989 | Balil et al. | 395/2 |
| 4,888,823 | 12/1989 | Nitta et al. | |
| 5,133,012 | 7/1992 | Nitta | 395/2.45 |
| 5,230,037 | 7/1993 | Giustiniani | 395/2 |
| 5,268,990 | 12/1993 | Cohen et al. | 395/2 |
| 5,317,673 | 5/1994 | Cohen et al. | 395/2.41 |

OTHER PUBLICATIONS

Tseng et al., Fuzzy Vector Quantazation applied to Hidden Markov Molding, 1987 Proceedings of the International Conference on Acoustics, Speech, and Signal Processing, vol. 2, pp. 641–644 (Apr. 6, 1987).

*Primary Examiner*—Allen R. MacDonald
*Assistant Examiner*—Richemond Dorvil
*Attorney, Agent, or Firm*—Finnegan, Henderson, Farabow, Garrett & Dunner, L.L.P.

[57] ABSTRACT

An A/D converter quantizes an input speech signal, a sound analyzing section provides an LPC sound analysis to quantized data, and feature parameters are extracted. A matching section obtains PS sequences in the 1st through nth places (n: an integer which is larger than 1) from the obtained feature parameters by use of a PS dictionary. An HMM learning section parameter-estimation learns the obtained PS sequences in the 1st through nth places by Baum Welch algorithm of a hidden Markov model as an individual learning PS sequence.

12 Claims, 6 Drawing Sheets

POWER  0 1 2 3 4 5 6 7
SYMBOL   . - 1 + 7 Z M

| FRAME NUMBER | START END (log) KHZ | POWER | LABEL SEQUENCE (PS SEQUENCE) 1ST 2ND 3RD 4TH 5TH |
|---|---|---|---|
| 1 | | 0 | |
| 2 | | 0 | |
| 3 | | 0 | |
| 4 | | 0 | |
| 5 | | 0 | |
| 6 | | 0 | ZE1E |
| 7 | ..-. | 0 S | ZE1E SA1E ZE2D |
| 8 | - .. .-. | | ZE1E ZE2D SA1E OY1E |
| 9 | .+..-.-. .. | | ZE2D SA1E ZE1E OY1E EE1 |
| 10 | -1--+---.--...- | | ZE2D EE1A AA2A AA1A RO1 |
| 11 | +1++1+++--+. . | | EE1A AA2A NN1A AA1A ZE2 |
| 12 | +7++1+++-+. | | EE1A AA2A NN1A AA1A NA1 |
| 13 | 171+7117++7+... | | EE1A AA2A NN1A NR1A AA1 |
| 14 | 1Z11Z111++1- . | | EE1A AA2A NR1A ER1A NN1 |
| 15 | 1711Z1171 11-..- | | NR1A EE1A YO1E ER1A NN1 |
| 16 | +711Z111--1-- . | | NR1A YO1E EE1A ER1A HA2 |
| 17 | +11+7++--+-+.+ | | NR1A ZE2D YO1E EROB EE1 |
| 18 | +1++7-++-----.+ | | YO1E NR1A RO2B ZE2D ERO |
| 19 | +7117+++-. ... | | ER1A YO1E NN1A ZE2D AN1 |
| 20 | -1---1++. | | NN1A NN2A UN2A AA1A OO1 |
| 21 | .+-+--.. | | RO2B AA1A EROB OO1A OO2 |
| 22 | +1+1---+. . | | OO1A RO2B AA1A NN2A NA1 |
| 23 | 177711++1+. ... | | OO1A AA1A NN1A NN2A OO2 |
| 24 | +777++-1+. . | | OO2A OO1A NN1A NN2A N12 |
| 25 | +117--+-++. .. | | OO2A NN2A OO1A ON1A NN1 |
| 26 | 1111..-.-.. | | OO2A NN2A NN1A OO1A NR1 |
| 27 | +11+.-+.-1- . | | OO2A NN2A NN1A ON1A OO1 |
| 28 | +111..-.-1-. | | OO2A ON1A NN2A OG1A OO1 |
| 29 | -+1+... - | | NN2A ON2A OO2A ON1A NN1 |
| 30 | 1777++7-+1- | | OO2A NN2A ON2N |
| 31 | .+1+...+ .+- | | OO1A |
| 32 | -. - . | E | |
| 33 | | 0 | |
| 34 | | 0 | |

F I G. 2

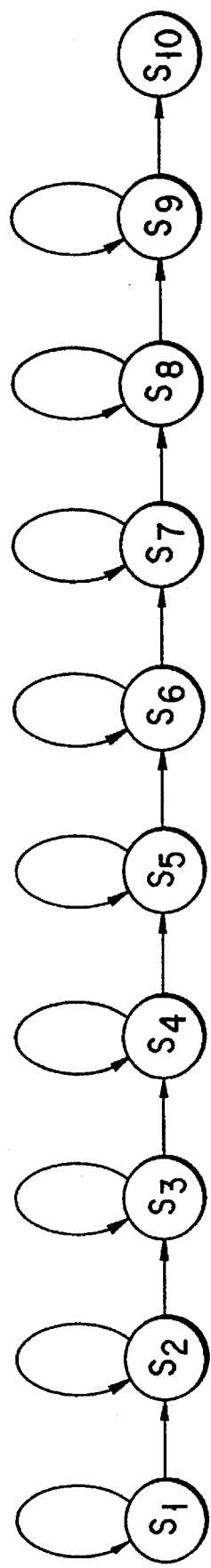
F I G. 3

WORD LIST

1. ACT  2. APT
3. BAND  4. BANK
5. BEND  6. BENT
7. TELEFAX  8. TELEX
9. NAME  10. AIM
11. FILE  12. LIKE
13. PRIDE  14. PRIME
15. DEFORM  16. DEFAULT
17. SKATE  18. SLATE
19. MARRY  20. MARY
21. WORD  22. WORK
23. ASK  24. BASK
25. CHANGE  26. CHANCE
27. CHAIR  28. CHEER
29. HAIR  30. HEAR
31. SWEET  32. SWEEP

FIG. 4

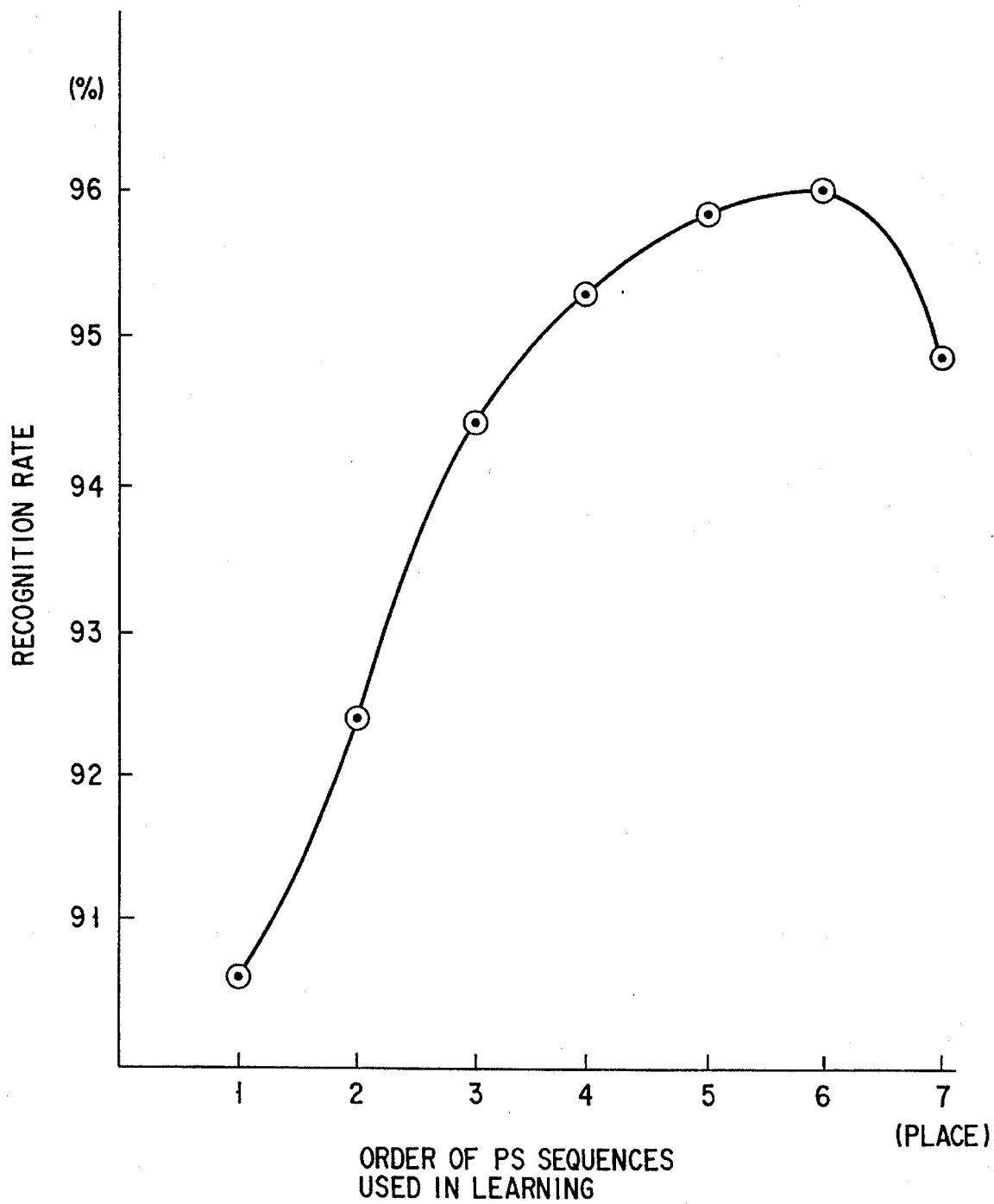
F I G. 5

SPEECH PATTERN RECOGNITION APPARATUS UTILIZING MULTIPLE INDEPENDENT SEQUENCES OF PHONETIC SEGMENTS

This application is a continuation of application Ser. No. 07/843,117 filed Feb. 28, 1992, now abandoned.

BACKGROUND OF THE INVENTION

1. Field of the Invention

The present invention relates to a pattern recognition apparatus which can recognize a pattern such as speech with high accuracy.

2. Description of the Related Art

There has been successfully made a pattern recognition apparatus in which an uttered speech is vectorquantized and a quantized code sequence is recognized by a HMM (Hidden Markov Model).

However, in the vector quantization, since a simple distance measure is normally used, the performance of HMM is reduced by a quantizing error. Moreover, the use of continuous output probability distribution has been reviewed in order to reduce the quantizing error. However, there is a problem in that the use of the continuous output probability distribution is very difficult to be put into practice since the amount of calculation is increased.

Though this is not a technique using HMM, U.S. Pat. No. 4,888,823 discloses a system wherein a LPC (Linear predictive coding) analysis of an input speech is performed, a phonetic segment sequence in 1st place, that is, label sequence, (hereinafter called as PS sequence) is learned, and the speech is recognized. The content of U.S. Pat. No. 4,888,823 is incorporated into the specification of this application for reference.

SUMMARY OF THE INVENTION

An object of the present invention is to provide a pattern recognition apparatus wherein HMM is sufficiently performed and an input pattern can be easily recognized with high accuracy.

Another object of the present invention is to provide a speech recognition apparatus wherein HMM is sufficiently performed and an uttered speech can be easily recognized with high accuracy.

In order to attain the above object, a pattern recognition system relating to the present invention comprises analyzing means for analyzing an input pattern and obtaining feature parameters, means for obtaining PS sequences in 1st through nth places (n: an integer which is larger than 1) for every frame from the feature parameters obtained by the analyzing means, means for outputting the obtained PS sequences in 1st through nth places as different learning PS sequences, and learning means for learning the output PS sequences in 1st through nth places.

According to the above structure, the respective PS sequences in 1st through nth places are independently or individually learned by HMM, so that learning can be made with a high recognition rate and the speech can be recognized with high accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 a view showing a result of LPC analysis, speech power, PS sequence, and starting and ending points of speech relating to a word "zero";

FIG. 3 is a view showing states of HMM;

FIG. 4 is a word list showing sets of words;

FIG. 5 is a view showing a relationship between the order of the PS sequence used in learning and a recognition rate.

DETAILED DESCRIPTION OF THE PREFERRED EMBODIMENTS

A pattern recognition apparatus relating to one embodiment of the present invention will be explained by showing a speech recognition apparatus recognizing an uttered word as an example.

Figure 1:
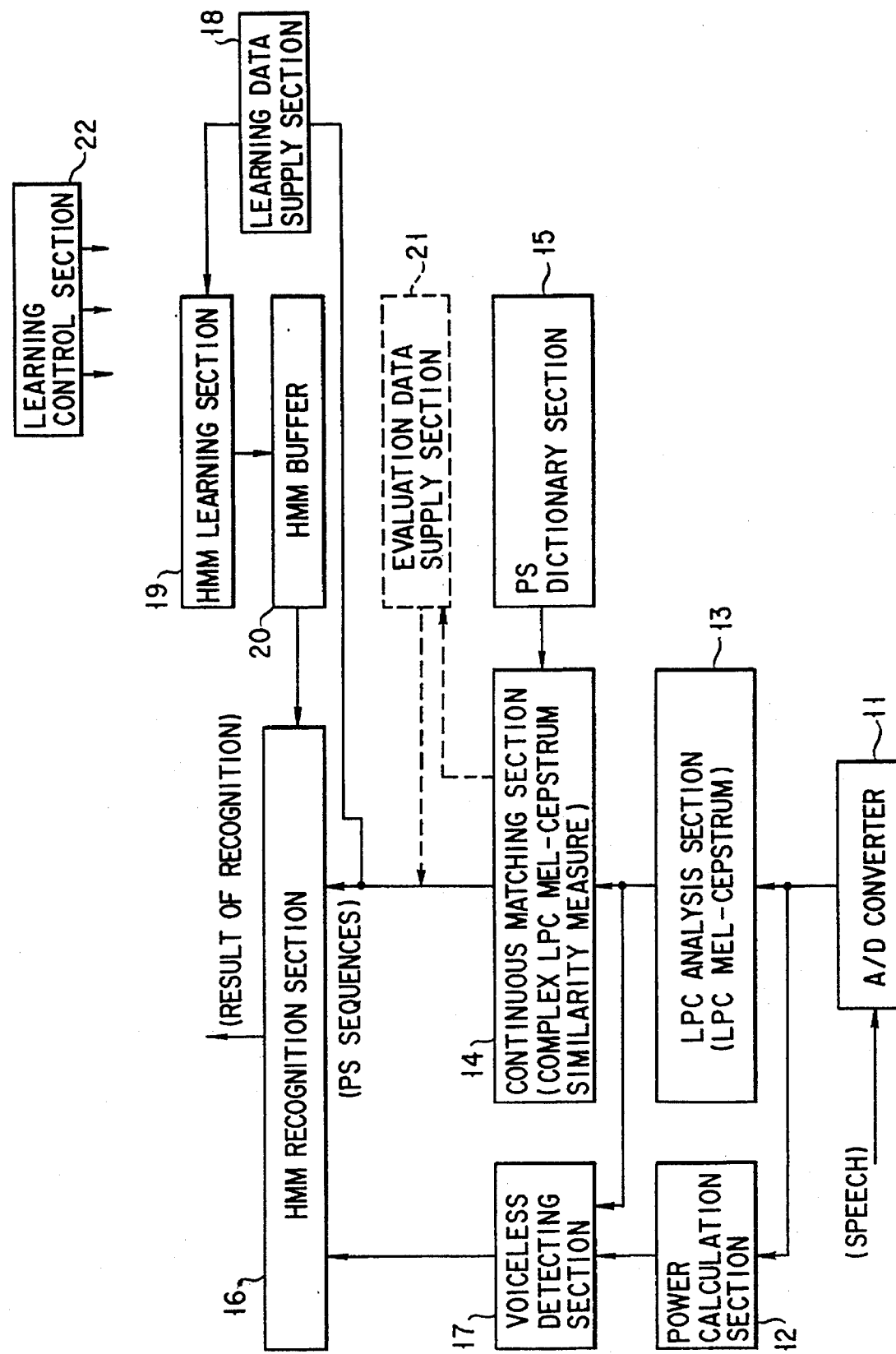
FIG. 1 is a block diagram showing a schematic structure of a pattern recognition apparatus relating to one embodiment of the present invention.

FIG. 1 schematically shows the speech recognition apparatus relating to the present invention. The speech recognition apparatus of FIG. 1 employs a phonetic segment (hereinafter called as PS) as a recognition processing unit, and continuously matching-processes PS of the input speech and PS stored in a dictionary in a time axis direction and obtains a PS sequences, and recognizes the obtained PS sequences by HMM.

An input speech signal is input to an A/D converter 11. The A/D converter 11 quantizes the input speech signal at a sampling frequency of, for example, 12 KHz to obtain a digital signal of 12 bits, and inputs quantization data to a power calculation section 12 and an LPC analysis section 13.

The power calculation section 12 obtains the power of the input speech signal based on quantization data.

The LPC analysis section 13 provides LPC analysis (linear predictive coding analysis) to supplied quantization data. The LPC analysis section 13 obtains an LPC mel-cepstrum of 16 orders as analysis parameters at for example 16 ms for frame length and 8 ms for frame cycle. The result of the LPC analysis is supplied to a continuous matching section 14.

A PS dictionary section 15 stores speech segment data, which is obtained in advance, in an orthogonalized dictionary. It is noted that the speech segment is described in the above-mentioned U.S. Pat. No. 4,888,823, and the content of U.S. Pat. No. 4,888,823 is incorporated into this specification for reference.

The continuous matching section 14 performs PS continuous matching process by use of a complex LPC mel-cepstrum similarity measure $S_{MC}$ expressed in the following formula.

$S_{MC} = [\Sigma Wm(C \cdot \phi m)]/\|C\|$ wherein C indicates LPC mel-cepstrum (vector), Wm, φm respectively indicate a weight obtained from an eigenvalue and an eigenvector of the label of PS "Ki". And (·) represents an inner product and ‖ ‖ represents a norm.

In other words, the continuous matching section 14 calculates PS complex similarity between the result of the LPC analysis of the input speech signal and each PS stored in the PS dictionary section 15, thereby obtaining PSs in 1st through nth places. The matching of a series of frames is continuously performed, so that PS sequences in 1st through nth places can be obtained. Both the power value from the power calculation 12 and the result of the LPC analysis from the LPC analysis section 13 may be used for the matching process.

A voiceless detecting section 19 detects a word speech in accordance with the speech power and the result of the LPC analysis, and sends the starting and end points of uttered word or words to an HMM recognition section 16.

FIG. 2 is a view showing the result of LCP analysis (more specifically, a power-spectrum into which the result of LPC analysis is converted so as to be visually understood), speech power, and outputs of PS sequences in 1st through fifth places or orders when a word "zero" is uttered. The speech continues from the seventh frame (start) to the 32nd frame (end).

The HMM recognition section 16 recognizes the input speech based on the detected speech distance, PS sequences, and the model obtained from leaning.

The speech recognition to be performed by the HMM (Hidden Markov Model) recognition section 16 will be explained in detail as follows.

First of all, the word verification to be performed by the HMM recognition section 16 will be generally explained. The word verification is performed for every word based on the HMM.

Here, the general formulation of the Hidden Markov Model will be explained. It is estimated that HMM has N states (nodes) S1 to SN and an initial state of the PS sequences is distributed to these N states in view of probability. Regarding the speech, there is used a model in which a state is transited every constant frame cycle at certain probability (transition probability). At the time of transit, a PS is output at certain probability (output probability), and there is often introduced a null transit in which the state transits without outputting a PS. Even if PS sequences are given, the state transit sequences are not fixed. It is only PS sequences that can be observed (this is the reason such a model is called as Hidden Markov Model.)

Model M of HMM is defined by the following six parameters:

N: number of states (states S1, S2, ... SN);

K: number of PS (R=1 to K; R is name of PS);

$p_{ij}$: probability in which state $S_i$ transits to $S_j$;

$q_{ij}(k)$: probability in which $PS_k$ is output when state $S_i$ transits to $S_j$;

$m_i$: probability of the initial state (probability in which the initial state is $S_i$); and F: a set of the final states.

Then, a limitation in which the feature of the speech is reflected on the transition is added to the model M. In the speech, it is not allowed to transit a loop in which the state returns to the state ($S_{i-1}$, $S_{i-2}$, ... ), which has already passed, from the state $S_i$, since such a transition confuses a time sequence relation.

The evaluation of HMM, probability Pr (O/M) outputting input PS sequences to all models is obtained.

At the time of recognition, HMM recognition section 16 estimates each model and searches model M such that Pr (O/M) becomes maximum. This model M is the result of recognition.

The learning of HMM will be explained.

First, a leaning data supply section 18 decomposes PS sequences, which are supplied from the continuous matching section 14, to PS sequences $O_1$ to $O_n$ in 1st through nth places, and supplied to an HMM learning section 19.

$O_1 = o_{11}, o_{21}, \ldots, o_{T1}$ $O_2 = o_{12}, o_{22}, \ldots, o_{T2}$

........................

$O_n = o_{1n}, o_{2n}, \ldots, o_{Tn}$

Next, the HMM learning section 19 estimates model M from the learning data supply section 10 such that Pr (O/M) becomes maximum relating to PS sequences in 1st through nth places (a method of estimation will be described in detail later). Then, the result of the estimation is stored in an HMM buffer 20.

Next, a word recognition process using HMM relating to PS sequences will be explained in detail.

The HMM used in this case is a left to right type as shown in FIG. 3. The HMM has ten states $S_1, S_2, \ldots, S_{10}$, and the initialstate is only S1, and the state transits at certain probability at 8 ms for frame cycle. At the time of transition, a PS is output at a certain output probability.

The following is the parameters of model M of the HMM of the present apparatus.

N: number of states (states $S_1, S_2, \ldots S_{10}$);

K: number of PS (PS name R=1, 2, ... 191);

$p_{ij}$: probability in which state $S_i$ transits to $S_j$; and $q_{ij}(k)$: probability in which PSk is output when state $S_i$ transits to $S_j$.

Also, the final state is limited to S.

Conventionally, HMM learning obtains PS sequences, which were in 1st places for each frame relating to learning data. The large number of learning data is supplied to the HMM learning section 19 by learning data supply section 18, and the parameters of each model M are estimated so as to maximize probability Pr (O/M) (method of estimation will be explained in detail later). The model M is stored in an HMM buffer 20. In contrast, according to the present invention, PS sequences, which were in 1st to nth places for each frame, are used in learning.

In HMM recognition, relating to each model stored in the HMM buffer 20, probability Pr (O/M) of PS sequences to input speech is obtained by the HMM recognition section 16. The word corresponding to the model M in which probability Pr (O/M) becomes maximum is the result of recognition.

The estimation of the parameters of HMM will be explained in detail.

In a case of a discrete output distribution HMM, a forward-backward algorithm of Baum Welch is known as algorithm for obtaining transition probability $P_{ij}$ of an arc from state i to state outputting probability $P_{ij}(k)$ on the arc from learning data. In the algorithm of Baum Welch, if a length of PS sequence is T, probability (forward probability) wherein PS sequences $o_0, o_1, \ldots, o_i$ are generated and reach to state i is a (i, t) (i=1, 2, ..., N; t=0, 1, ..., T), probability (backward probability) wherein PS sequences $o_{t+1}, o_{t+2}, \ldots, o_T$ are generated is β(i, t) (j=1, 2, ..., N; t=T, T−1, ..., 0), and probability wherein model M outputs PS sequence $o_1, o_2, \ldots, o_T$ is P(O/M), the following equation can be defined:

$$r_t(i, j) = \frac{\alpha(i, t-1) p_{ij} q_{ij}(o_t) \beta(j, t)}{P(O/M)}$$

The reestimation value of transition probability $P_{ij}$ and that of output probability $q_{ij}(k)$ are expressed by the following equations:

$$p_{ij} = \sum_t r_t(i,j) / \sum_t \sum_j r_t(i,j)$$

$$p_{ij}(k) = \sum_t r_t(i,j) / \sum_t r_t(i,j)$$

According to the above process, a number of learning data is sequentially supplied to the HMM learning section 19 by the learning data supply section 18, and reestimation is performed.

The above reestimation is repeated while learning the number of learning data till the parameters locally converge into suitable values or reach to the maximum number of repetitions.

The feature of the above-mentioned embodiment lies in a data origination method of learning data. As shown in FIG. 2, the speech segments of the word "zero" in the 1st through 5th places for each frame are obtained. Learning data of PS sequences in first to nth place such as PS sequences (ZE1E, ZE1E, ... , 002A, OO1A) in the 1st place, which is from start to end, and PS sequences (SA1E, ZE2D, ..., NN2A) in the second place are used. Thereby, even if a correct PS sequence in the first place cannot be obtained, the parameters of HMM are estimated based on the PS sequence in the lower places. Due to this, the recognition performance is considerably improved. This is equal to the fact that learning data increases by n times.

FIG. 4 is a word list showing sets of words. In FIG. 4, 16 pairs of similar words such as "act" and "apt" are provided and these words are difficult to be recognized. FIG. 5 shows the results of the experiment of recognition in a case where the PS sequences of the sets of words of FIG. 4 in the only 1st place, those in the 1st and 2nd places, those in the 1st to 3rd places, those in the 1st to 4th places, those in the 1st to 5th places, those in the 1st to 6th places, and those in the 1st to 7th places are used as learning data. In this experiment, thirty men speakers uttered learning data one time, respectively, and evaluation data was uttered by another 10 men speakers. As shown in FIG. 5, the recognition rate is improved in accordance with the 1st and 2nd places, those in the 1st to 3rd places, those in the 1st to 4th places, those in the 1st to 5th places, and those in the 1st to 6th places as compared with only use of the 1st place. However, the recognition rate decreases if the PS sequences in the 1st to 7th places are used.

PS sequences of learning data wherein five 1st places, four 2nd places, three third places, two fourth places, and one fifth place are included are supplied to the HMM learning section 19 by learning data supply section 18, thereby making it possible to weight the PS sequences in accordance with the places of the PS sequences.

It is possible to automatically detect a suitable place n to be used. In this case, the learning data supply section 18 automatically changes the place n (n=1, 2, . . . ) of the PS sequences and learning data is supplied to the HMM learning section 19. The learning control section 22 controls such that the obtained model relating to each n is sequentially stored in the HMM buffer 20. Then, the word recognition of evaluation data stored in an evaluation data supply section 21 in advance. Thereby, the relationship between the places of PS sequences used in the learning and the recognition rate can be obtained as shown in FIG. 5, and a suitable n can be determined. In FIG. 5, a maximum recognition rate is shown when n is 6, and a suitable place n is 6. In a case where the present apparatus is operated as a recognition apparatus, the model relating to a suitable n may be recorded in the HMM buffer 20 and used in recognition.

Figure 6:
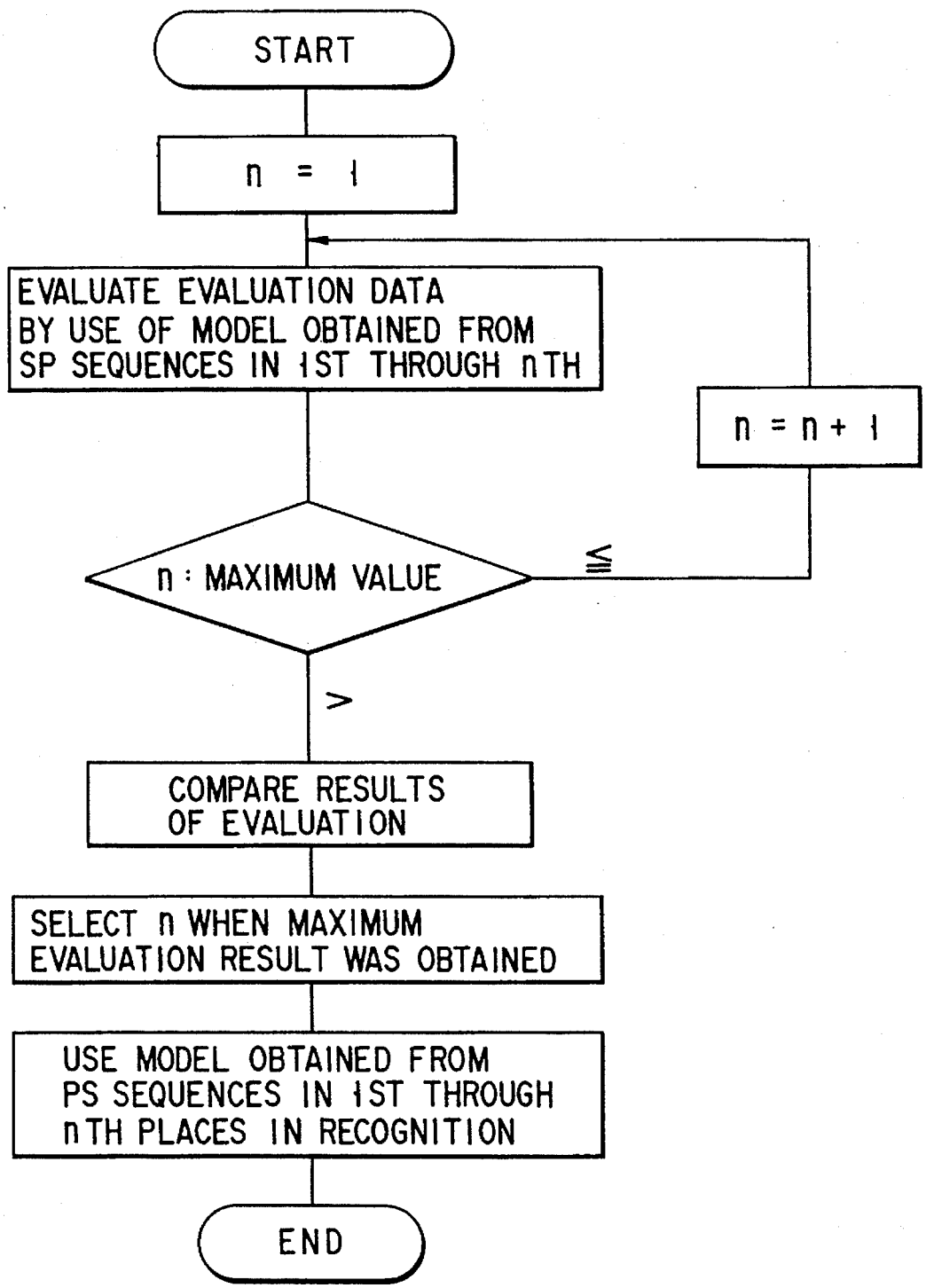
FIG. 6 is a flow chart showing one example of a learning control operation of a learning controller.

FIG. 6 is a flow chart showing one example of a learning process. An operation of each part is controlled by a learning control section 22 comprising a microcomputer. By this structure, a suitable n can be automatically detected.

Since evaluation data is stored in the evaluation data supply section 21 in advance, it is unnecessary for speakers for evaluation to utter the same word a plurality of times.

In a case where the speech recognition apparatus is used for unspecified users, such a recognition apparatus can be used in a state that a learning section including learning data supply section 18, HMM learning section 19 and evaluation data supply section 21 are separated.

In a case where the speech recognition apparatus is used for specified users, the suitable n is often different, depending on the users. Due to this, in order to obtain a suitable n for every user, the evaluation word is uttered by the specific user and the obtained PS sequences are once stored in the evaluation data supply section 21. Then, the word recognition of the model relating to each n stored in the HMM buffer 20 is performed by the HMM recognition section 16, so that a suitable place n can be obtained. If the model relating to the obtained suitable place n is used in the recognition thereafter, a suitable recognition apparatus for the specific users can be used.

The above explained the speech recognition. However, this can be applied to a character recognition, and an image recognition.

As explained above, according to the pattern recognition apparatus of the present invention, in performing HMM learning (estimating the parameters), the PS sequences in the 1th through nth places (n: an integer which is larger than 1) are learned, so that learning can be made with high performance and the pattern such as speech can be recognized with high accuracy.

Additional advantages and modifications will readily occur to those skilled in the art. Therefore, the invention in its broader aspects is not limited to the specific details, and illustrated examples shown and described herein. Accordingly, various modifications may be made without departing from the spirit or scope Of the general inventive concept as defined by the appended claims and their equivalents.

What is claimed is:

1. A pattern recognition apparatus comprising:

analyzing means for analyzing a learning pattern and obtaining feature parameters;

dictionary means for storing a relationship between predetermined feature parameters and phonetic segments (PSs), each said PS being a unit having a predetermined one meaning phonetically;

means for obtaining PS sequences estimated to correspond to the feature parameters obtained by said analyzing means based on the relationship stored in said dictionary means, said means obtaining a first sequence of the PSs that are most analogous to the feature parameters, through an nth sequence, the nth sequence being less analogus to the feature parameters than the first sequence, where n is an integer greater than 1;

supply means for supplying the obtained first through nth PS sequences as independent learning PS sequences, respectively; and learning means for learning the first through nth PS sequences supplied from said supply means as PS sequences corresponding to said learning pattern.

2. The pattern recognition apparatus according to claim 1, wherein said learning means includes means for obtaining a probability that predetermined models will output the PS sequences corresponding to the learning pattern, respectively, based on a parameter-estimation learning by Baum Welch algorithm of a hidden Markov model, and for specifying a model having a highest probability.

3. The pattern recognition apparatus according to claim 2, further comprising recognition means wherein input evaluation phoneme data is recognized using models having the highest probability obtained by said learning means, obtained recognition rates are compared, and a model showing the highest recognition rate is employed as a recognition model.

4. The pattern recognition apparatus according to claim 2, further comprising means for storing a plurality of models having the highest probability obtained by said learning means, and means for recognizing PS sequence obtained from speech of unknown users using the plurality of models stored in said storing means, comparing obtained recognition rates, and employing the model showing the highest recognition rate.

5. The pattern recognition apparatus according to claim 1, further comprising HMM recognition means for obtaining a PS sequence of an input pattern and recognizing the input pattern in accordance with learning results of said learning means.

6. The pattern recognition apparatus according to claim 1, wherein said learning pattern is a speech input pattern, and said analyzing means is sound analyzing means for analyzing speech input patterns and obtaining feature parameters.

7. A method for recognizing a pattern comprising the steps of:

storing a relationship between predetermined feature parameters and phonetic segments (PSs) into dictionary means, each of said PSs being a unit having a predetermined one meaning phonetically;

analyzing an input speech pattern based on said relationship stored in said dictionary means and obtaining feature parameters;

obtaining n PS sequences estimated to correspond to the feature parameters obtained by said analyzing process, said obtaining process transforming the feature parameters into a plurality of PSs, each of the n PS sequences including one PS from each feature parameter, where n is an integer greater than 1; and learning each of the obtained n PS sequences in first through nth place as an individual learning PS sequence, respectively.

8. The method for recognizing a pattern according to claim 7, wherein said learning step includes steps of obtaining probability that predetermined models will output the PS sequences in the 1st through nth places, respectively, based on a parameter-estimation learning by Baum Welch algorithm of a hidden Markov model, and specifying a model having the highest probability.

9. The method for recognizing a pattern according to claim 8, further comprising the steps of recognizing input evaluation phoneme data by using a category having the highest probability obtained in said learning step, comparing obtained recognition rates, and employing the model showing the highest recognition rate as a recognition model.

10. The method for recognizing a pattern according to claim 8, further comprising the steps of storing a plurality of models having the highest probability obtained by said learning step, recognizing input evaluation phoneme data for unknown users using the plurality of the models stored in said storing means, comparing obtained recognition rates, and employing the model showing the highest recognition rate as a recognition model.

11. The method for recognizing a pattern according to claim 7, further comprising the step of obtaining a PS sequence of an input pattern, and recognizing the input pattern in accordance with learning results of said learning step.

12. The method for recognizing a pattern according to claim 7, wherein said input pattern is a speech input pattern, and said analyzing step is a sound analyzing step of analyzing an input pattern and obtaining feature parameters.

\* \* \* \* \*